United States Patent

[11] 3,611,427

| [72] | Inventors | Masanori Kobayashi<br>5-9, 2-chome, Honda Kokubunji-shi, Tokyo;<br>Yukimitsu Ubukata, 849-2, Asahi-cho, Funabashi, Chiba, both of Japan |
|---|---|---|
| [21] | Appl. No. | 16,066 |
| [22] | Filed | Mar. 3, 1970 |
| [45] | Patented | Oct. 5, 1971 |
| [32] | Priority | Mar. 3, 1969, July 21, 1969 |
| [33] | | Japan |
| [31] | | 44/15417 and 44/68776 |

[54] LONGTIME RECORDING CHART SET
12 Claims, 13 Drawing Figs.

| [52] | U.S. Cl. | 346/137 |
|---|---|---|
| [51] | Int. Cl. | G01d 15/32 |
| [50] | Field of Search | 346/137 |

[56] References Cited
UNITED STATES PATENTS

| 2,739,031 | 3/1956 | Meer | 346/137 X |
| 2,938,760 | 5/1960 | Hollein | 346/137 |

*Primary Examiner*—Joseph W. Hartary
*Attorneys*—Robert E. Burns and Emmanuel J. Lobato

ABSTRACT: A set of longtime recording charts comprising disk-shaped charts each of which is formed with a sector-shaped cutout and a tab, and a disk-shaped chart base formed with square-shaped cutouts. The tabs are folded into the cutouts as the charts are stacked on the base, so that the assembly is joined as a unit. However, upon completion of the record on each chart, the recording operation is continued through the cutout of said chart onto the immediately underlying chart, while the already-recorded chart is separated from the set.

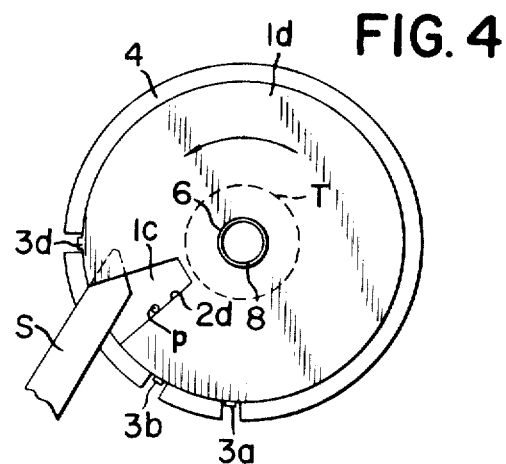
FIG. 4
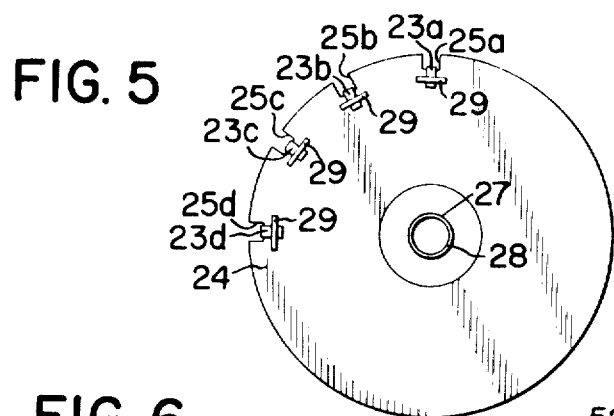
FIG. 5
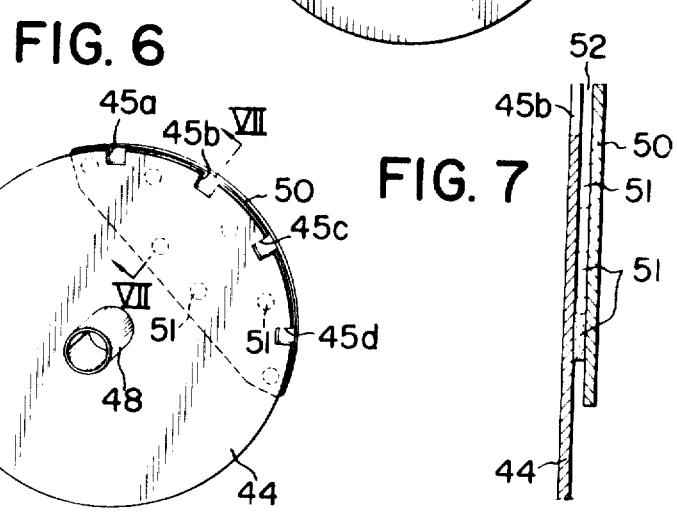
FIG. 6
FIG. 7

LONGTIME RECORDING CHART SET

This invention relates to a device including a set of longtime recording charts for use with a tachograph on an automobile.

A conventional longtime recording chart set comprises a chart base to be secured on the chart table of a tachograph, a plurality of round-shaped charts having sector-shaped cutouts and which are stacked on said chart base, and a plurality of tape pieces for connecting said charts to said base, the sector-shaped cutouts being shifted in position in an orderly way at certain intervals in a given direction, so that on completion of recording on each chart the tape is cut off to permit continuation of the recording on the following chart. The conventional device requires time and skill in the connection with the tape pieces because the tape pieces have to be pasted at one end diametrally to the periphery of the charts and at the other end to the periphery of the chart base. In addition, the conventional set involves various difficulties in the design of test pieces because the rotative force to be transmitted from the chart base to the charts, and the force with which the tape pieces are cut off, both act in the direction normal to the axes of the individual tape pieces and, accordingly, the tape pieces will not be cut off if the width is increased to ensure adequate transmission of rotative force, or will be separated prematurely before the cutoff if the width is decreased to facilitate the cutting.

The present invention eliminates the foregoing difficulties of the conventional devices, and provides a new and improved set of longtime recording charts.

In accordance with the present invention, there is provided a chart base and a set of longtime recording charts comprising a plurality of disk-shaped charts each having a sector-shaped cutout therein, and a tab which protrudes outwardly from the periphery thereof. The plurality of charts are placed one upon another on the chart base, with the cutouts formed therein being shifted in position in an orderly fashion at certain intervals in a given direction. The chart base is formed with square-shaped cutouts adapted to receive and engage with said tabs. Thus, because the charts are connected together by simply folding their tabs into the cutouts, the charts are combined in a simplified way. Moreover, the transmission of the rotative force from the chart base to the charts as a whole can be positively achieved through the medium of the tabs in engagement with the square-shaped cutouts. Since a recorded chart is simply separated from the rest by pulling its tab out of engagement with the corresponding square-shaped cutout, the separation of the charts is accomplished with ease and smooth tachographic recording over a long period of time is thereby ensured. Thus, it is an object of the present invention to provide a set of longtime recording charts wherein the individual charts are connected with ease.

Another object of the invention is to provide a set of longtime recording charts wherein the individual charts are positively connected and are easily separated.

Other features, advantages, and objects of the present invention will become evident from the following description taken in conjunction with the accompanying drawings in which:

FIG. 4 is front view of the set as set on a tachograph;

FIG. 5 is a rear view of another embodiment of the invention;

FIG. 6 is a perspective view of a round-shaped chart base of still another embodiment of the invention;

FIG. 7 is an enlarged sectional view taken along the line VII—VII of FIG. 6;

Figure 1:
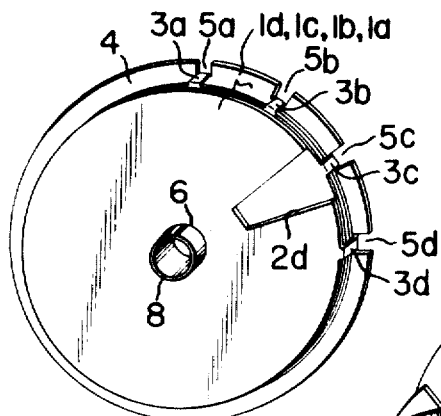
FIG. 1 is a perspective view of a set embodying the invention.
Figure 2:
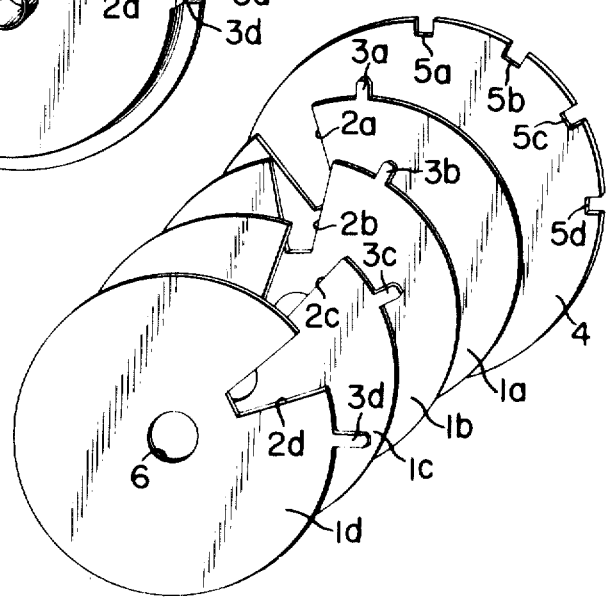
FIG. 2 is a perspective view of the set as separated, showing the individual charts and the chart base.
Figure 3:
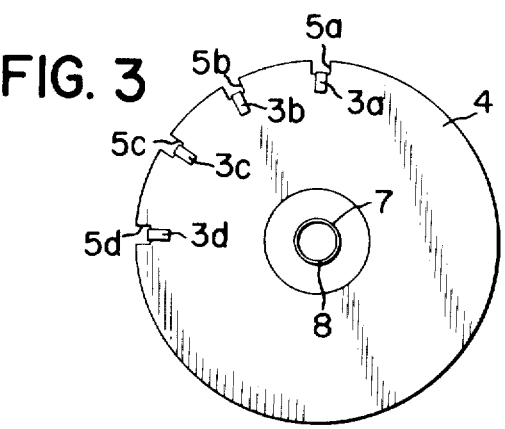
FIG. 3 is a rear view of the set.

Referring to FIGS. 1 to 4, disk-shaped charts $1a$, $1b$, $1c$ and $1d$ are of identical size and shape, formed respectively with sector-shaped cutouts $2a$ to $2d$, each tapering from the periphery toward the center of the chart. The charts are also formed with thin tabs $3a$ to $3d$, each protruding radially from a portion of the chart periphery close to the cutout. The length of the tabs $3a$ to $3d$ is chosen in consideration of the thickness of the charts to be superposed.

A disk-shaped chart base 4 is slightly larger in diameter than the above described charts and is provided along its periphery with square-shaped cutouts $5a$ to $5d$ at intervals each of which is approximately equal to the opening width of each sector-shaped cutout.

The charts $1a$ to $1d$ are formed with a chart washer hole 6, each, in the center. The chart base also has a chart washer hole 7 in the center, in which a tubular bushing 8 is securely fitted.

The charts are superposed in the following manner. First, the chart $1a$ is placed on the base 4 with the chart washer hole 6 carried on the chart bushing 8. The tab $3a$ is bent at its root into engagement with the square-shaped cutout $5a$ and is further folded at its tip beyond the cutout along the reverse side of the chart base. Next, another chart $1b$ is placed over the chart $1a$ and the tab $3b$ is folded back in engagement with the cutout $5b$ and further along the reverse side of the chart base. The same procedure is repeated until the other charts $1c$ and $1d$ are connected, in succession, with the chart base 4.

The set of charts above described is set on a chart plate T of a tachograph and the chart bushing 8 is fixed to the chart plate, so that the chart set is rotated in the direction indicated by the arrow in FIG. 4. A recording stylus $p$ is used for recording in contact with the uppermost chart $1d$. When the chart has nearly completed a full revolution, and the stylus $p$ has entered the cutout $2d$ and come into contact with the surface of the chart $1c$ as illustrated in FIG. 4, a chart separator S is inserted at the cutout $2d$ into the boundary between the charts $1d$ and $1c$ to force the tab $3d$ outward with the inclined edge. This procedure frees the chart $1d$ from the chart base 4, and permits it to be easily removed from the base. With the chart $1d$ thus removed, the recording stylus may continue to make its mark on the new chart $1c$. This cycle is repeated with the rest of charts, i.e., the charts $1b$ and $1a$, so that the tachographic recording is made without interruption over a lengthy period of time.

FIG. 5 shows a modification of the embodiment described above, wherein a set of charts is assembled with tabs $23a$ and $23d$ folded back on the reverse side of a chart base 24, and with their ends being secured in position against the rear face of the base by thin tape pieces 29, pasted crosswise, or in the direction at right angles to the folded tab ends. The structure of the individual charts is similar to that shown in FIGS. 1 and 2, and the numerals $25a$ to $25d$, 27 and 28 in FIG. 5 designate parts which are substantially the same as the corresponding parts in the preceding figures.

When the set of FIG. 5 is used on a tachograph, the charts and chart base remain firmly assembled and no unintended separation of the charts can occur. At the moment when any chart is to be separated, its tab is pulled back normal to the longitudinal direction of the tape piece, so that the tape piece is readily torn off and the chart is easily set free.

FIG. 6 shows a disk-shaped chart base 44 for a chart set having a backing sheet 50 attached spotwise with adhesive 51 to a part of the rear side of the base 44 so as to cover the square-shaped cutouts $45a$ to $45d$ from behind. As better shown in FIG. 7, there is provided a gap 52 between the chart base 44 and the backing sheet 50 in the areas surrounding the cutouts 45a to 45d. In this embodiment the individual charts are identical with those shown in FIGS. 1 and 2, and the numeral 48 designates a part substantially equal to the like part 8 in FIGS. 1 and 2.

On the round-shaped chart base 44 with the backing sheet are placed charts of the corresponding contour and the tabs of the charts are folded into the square-shaped cutouts of the chart base and the tab ends are further folded down into the space defined between the chart base and the backing sheet, with the result that the charts and the base are firmly assembled together, and any unintended separation of the charts is avoided.

Figure 8:
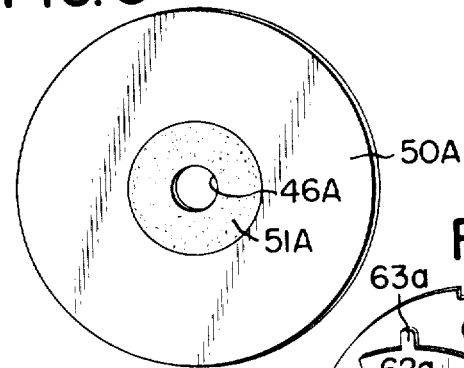
FIG. 8 is a perspective view of a backing sheet adapted to replace the one shown in FIG. 6.

The backing sheet 50 shown in FIG. 6 may be replaced by a sheet 50A as in FIG. 8, which is round-shaped and is formed with a chart washer hole 46A in the center. This backing sheet 50A is attached to the rear side of the round-shaped chart base 44 with adhesive 51A applied around the chart washer hole 46A, thus leaving a space between the chart base 44 and the backing sheet 50A. Again, the tabs of the charts are folded into the notches 45a—d, and then into the gap between the base and the backing 50A.

Figure 9:
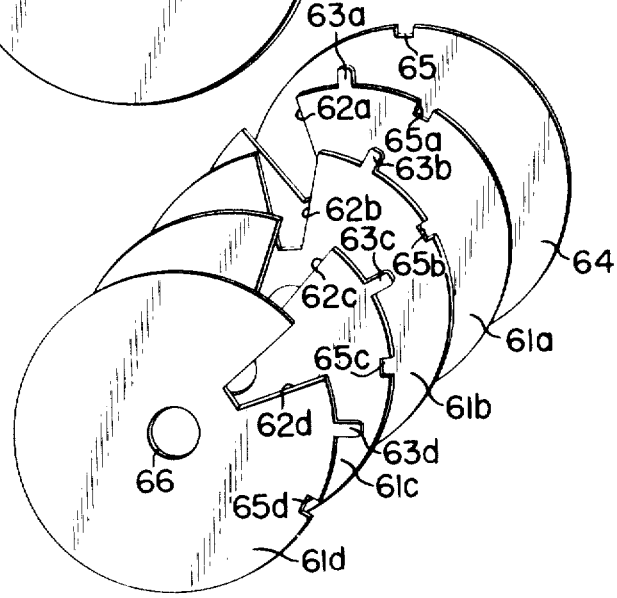
FIG. 9 is a perspective view of yet another embodiment of the invention, showing a separated set of individual charts and the base.

In another embodiment shown in FIG. 9, disk-shaped charts 61a, 61b, 61c and 61d are of identical configurations, formed respectively with sector-shaped cutouts 62a to 62d centripetally from the periphery, Thin tabs 63a to 63d protrude radially from the periphery close to the cutouts. In addition, square-shaped notches 65a to 65d are formed centripetally from the portions of the periphery close to said tabs, each of said notches having a width approximately equal to that of the tabs, and a depth about equal to the thickness of the tab. The disk-shaped chart base 64 is of the same diameter as the charts and is formed with a square-shaped cutout 65 extending centripetally and having dimensions about equal to the chart notches.

The charts are placed on the base 64 with tabs 63a to 63d folded one after another in square-shaped cutouts 65a to 65c and 65 of the immediately underlying charts or the base. In this manner the individual charts are sequentially connected positively with the base. Since the charts are of the same size and shape, any desired number of charts may be superposed, connected, and assembled with the base, without any modification in the design, for continuous recording for many hours. Furthermore, the set can be manufactured at low cost in a simplified way. Reference numeral 66 indicates a part substantially the same as the corresponding part 6 shown in FIGS. 1 and 2.

In another modification of the set shown in FIG. 9, the tabs 63a to 63d folded in succession into the cutouts of the ensuing charts are attached at their tips to the rear sides of the underlying charts or base with the aid of narrow tape pieces of paper pasted crosswise as shown in FIG. 5. This modification ensures even firmer connection among the charts and the base.

Figure 10:
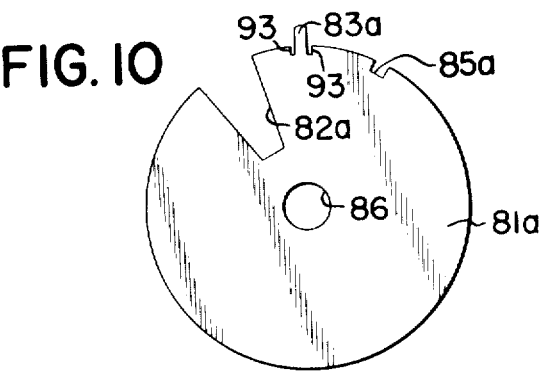
FIG. 10 is a front view of a disk-shaped chart of another embodiment of the invention.

FIG. 10 shows a chart 81a, having a construction similar to that illustrated in FIG. 9. On each chart 81a the tab 83a has slits 93 on both sides which extend centripetally from the periphery of the chart. As the tab is folded into the square-shaped cutout of the ensuing chart, it is bent at a right angle from the extremities of the slits 93, so that the tab can be securely engaged with the cutout for positive transmission of the rotative force. Parts designated by numerals 82a, 85a and 86 are substantially the same as the counterparts in FIG. 9.

Figure 11:
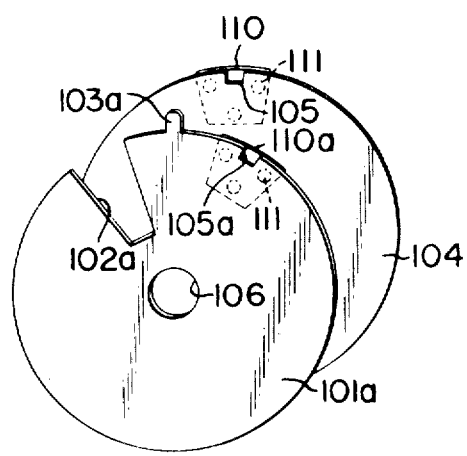
FIG. 11 is a fractional perspective view of a chart and a base in another embodiment of the invention.

In FIG. 11 there is shown another embodiment in which the square-shaped cutouts of the charts and the base of the embodiment illustrated in FIG. 9 are provided with backing sheets. For the sake of clarity, only the chart base 104 and a chart 101a out of the set of the same construction are shown. Backing sheets 110 and 110a are attached with adhesive 111, respectively, to the rear of the square-shaped cutout 105 of the round-shaped chart base 104 and to the rear of the square-shaped cutout 105a of the round-shaped chart 101a. Accordingly, there are provided sufficient gaps for the insertion of the folded tips of tabs between the chart base 104 and the backing sheet 110 and between the chart 101a and the backing sheet 110a. Parts designated by numerals 102a, 103a and 106 are substantially the same as the corresponding parts in FIG. 9.

In the manner above described the tabs are folded in succession into the square shaped cutouts of the ensuing charts and further into the gaps between the cutouts and their backing sheets, whereby an assembly is provided which is firm and tight and yet easy to disconnect.

In a further modification of the set of charts according to the present invention, each tab of chart shown in FIG. 11 is formed with slits on both sides at the root as illustrated in FIG. 10.

Figure 13:
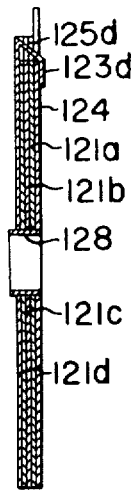
Figure 12:
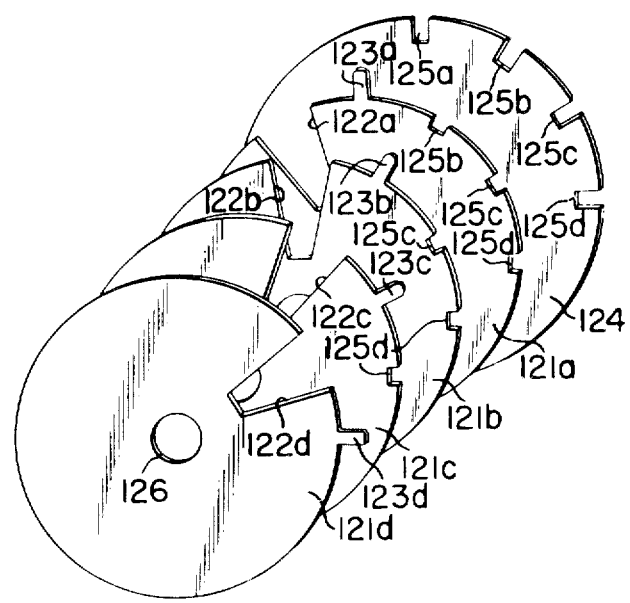
FIG. 12 is a perspective view of another embodiment of the invention showing a separated set of charts and the base; and, FIG. 13 is a vertical sectional view of the charts of FIG. 12 as assembled and combined together with a single tab extended therethrough.

The chart set shown in FIG. 12 comprises charts 121a to 121d which are formed with sector-shaped cutouts 122a to 122d and tabs 123a to 123d, respectively. In addition, the underlying charts are formed with a square-shaped cutout or cutouts 125a to 125d in numbers corresponding to the numbers of charts to be placed thereon, at certain intervals along the peripheries of the individual charts. Also, the chart base 124 is formed with square-shaped cutouts 125a and 125d, corresponding in number to the number of charts to be superposed at corresponding intervals along the periphery thereof. Reference numeral 126 indicates a part which is substantially the same as the counter part shown in FIGS. 1 and 2. The charts 121 are placed on the base 124, one upon another, and the tab 123a of the chart 121a is folded in engagement with the square-shaped cutout 125a of the chart base, and then the tab 123b of the chart 121b is folded and engaged with both the square-shaped cutout 125b of the chart 121a and the cutout 125b of the chart base 124. In the similar fashion, the tab 123c fits in the square-shaped cutouts 125c of the underlying charts and of the chart base. The tab 123d likewise engages all of the underlying cutouts 125d. As can be seen from FIG. 13, the tab 123d is folded aslant through all of the cutouts 125d of the charts and base to the rear side of the chart base 124, so that the charts and base are securely connected together.

Another modified set of charts is provided by the present invention wherein the tabs 123a to 123d folded back at the tips on the rear side of the chart base 124 are pasted in position with narrow tape pieces of paper as illustrated in FIG. 5.

Still another modified chart set according to the invention is such that a backing sheet as shown in FIG. 6 or FIG. 8 is pasted to the rear side of the square-shaped cutouts 125a to 125d of the chart base 124.

A further modified form of the chart set is such that the tab of each chart is formed with slits on both sides as shown in FIG. 10.

All of these modifications of this embodiment of the invention provide positive connection of the charts to the chart base, and permit easy removal of the charts.

What is claimed is:

1. A set of longtime recording charts which comprises a chart base, and a plurality of disk-shaped charts each having a sector-shaped cutout and a tab which protrudes outwardly from the periphery, said plurality of charts are placed one upon another on said base with the cutouts shifted in position so that the leading edge of the cutout of each respective chart lies closely adjacent the trailing edge of the next lower chart in the set, said chart base having at least one cutout therein for receiving the tab of at least one of said charts.

2. A set of longtime recording charts as defined in claim 1, in which the chart base is disk-shaped and is larger in diameter than the plurality of charts, said base having a plurality of cutouts therein in the form of notches spaced about its periphery, said plurality of notches corresponding in number to the total number of charts stacked thereon, said notches are spaced at intervals to individually receive the respective tabs on the charts, said tabs are folded into said notches and against the rear side of the chart base.

3. A set of longtime recording charts as defined in claim 2 which includes tape pieces pasted crosswise on the tips of the tabs folded against the rear side of the chart base, thereby securing the tab tips thereto.

4. A set of longtime recording charts as defined in claim 2 which includes a backing sheet attached to the rear of the chart base at a plurality of points to provide a gap between the adjacent faces of the backing sheet and chart base, said tabs being folded into said gap.

5. A set of longtime recording charts as defined in claim 1 in which each chart and the chart base has a single cutout therein for receiving the tab from the chart immediately thereabove.

6. A set of longtime recording charts as defined in claim 5 in which the charts are formed with slits on both sides of the tab thereof, said slits extending radially from the periphery of each chart.

7. A set of longtime recording charts as defined in claim 5 which includes tape pieces pasted crosswise on the tips of the tabs folded in engagement with the square-shaped cutouts of the underlying charts to the rear sides of said underlying charts so as to secure the tab tips thereto.

8. A set of longtime recording charts as defined in claim 5 including backing sheets attached to the rear sides of the charts, adjacent the cutouts thereof, each providing a gap therebetween, to receive the folded tabs in the gaps defined between the cutouts and the respective backing sheets.

9. A set of longtime recording charts as defined in claim 1 in which cutouts are formed on the chart base and the charts in numbers corresponding to the numbers of charts to be superposed thereon, at given intervals around the peripheries of the individual charts, and the tabs of said charts are folded in engagement with all of the square-shaped cutouts of the underlying charts and also the cutouts of the chart base.

10. A set of longtime recording charts as defined in claim 9 in which the tabs on the individual charts are formed with slits at both sides of the roots thereof, said slits extending centripetally from the peripheries of the charts.

11. A set of longtime recording charts as defined in claim 9 which includes tape pieces pasted crosswise on the tips of the tabs folded in engagement with the square-shaped cutouts of the chart base to the rear side of said base, thereby securing the tab tips to the base.

12. A set of longtime recording charts as defined in claim 9 including a backing sheet attached to the rear side of the cutouts of the chart base so that the tabs can be folded in a gap defined between the cutouts of the backing sheet.